United States Patent [19]

Drori et al.

[11] Patent Number: 4,890,108

[45] Date of Patent: Dec. 26, 1989

[54] MULTI-CHANNEL REMOTE CONTROL TRANSMITTER

[75] Inventors: Ze'Ev Drori; Moti Segal, both of Chatsworth, Calif.

[73] Assignee: Clifford Electronics, Inc., Chatsworth, Calif.

[21] Appl. No.: 243,080

[22] Filed: Sep. 9, 1988

[51] Int. Cl.⁴ ................................................ H04L 9/04

[52] U.S. Cl. .................................... 341/176; 340/636; 340/825.65; 340/825.69; 340/539

[58] Field of Search .................... 340/696, 539, 825.73, 340/825.72, 825.76, 825.65, 825.69, 636; 455/151, 100, 95, 603, 97; 341/176, 177, 178, 175, 187

[56] References Cited

U.S. PATENT DOCUMENTS

| | | | |
|---|---|---|---|
| 4,208,654 | 6/1980 | Vogt et al. | 341/176 X |
| 4,327,444 | 4/1982 | Court | 455/100 |
| 4,366,482 | 12/1982 | Remes et al. | 455/95 X |
| 4,383,242 | 5/1983 | Sassover et al. | 340/64 |
| 4,447,798 | 5/1984 | Shapiro | 341/187 X |
| 4,464,651 | 8/1984 | Duhame | 340/825.72 X |
| 4,535,333 | 8/1985 | Twardowski | 340/825.69 |
| 4,660,027 | 4/1987 | Davis | 340/636 |
| 4,725,827 | 2/1988 | Gallegos, Jr. et al. | 455/100 X |
| 4,762,429 | 9/1988 | Fujikawa | 340/636 X |
| 4,794,368 | 12/1988 | Grossheim et al | 340/63 |

*Primary Examiner*—Reinhard J. Eisenzopf
*Assistant Examiner*—Robert W. Mueller
*Attorney, Agent, or Firm*—Roberts and Quiogue

[57] ABSTRACT

A multi-channel remote control transmitter is disclosed for control of apparatus such as vehicle security systems, garage door openers, and the like. The transmitter provides the capability of selecting one of many different channels or codes to be transmitted with a minimum number of control switches. The transmitter includes at least one channel select switch and a transmit switch. The user actuates the channel select switch to select a desired channel, and then actuates the transmit switch to actually transmit the selected channel code. The transmitter includes an audible or visual indicator for confirming to the user the particular channel selected. The transmitter provides an audible "battery low" signal when the battery voltage drops below a predetermined level.

52 Claims, 13 Drawing Sheets

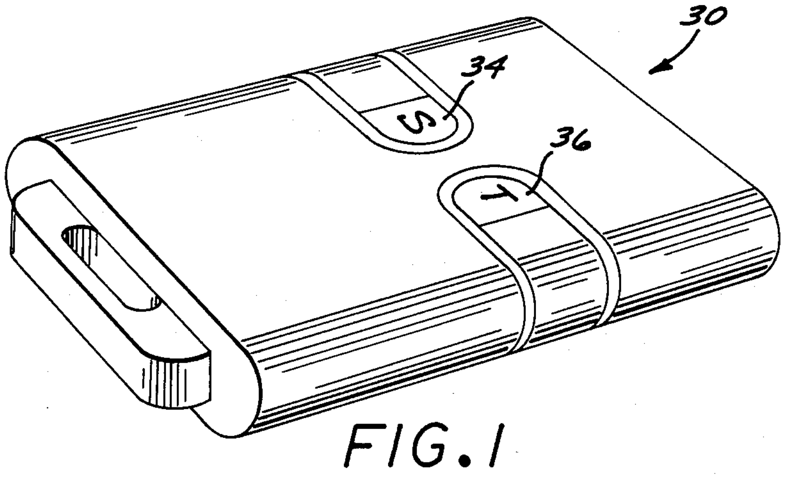
FIG. 1
FIG. 3
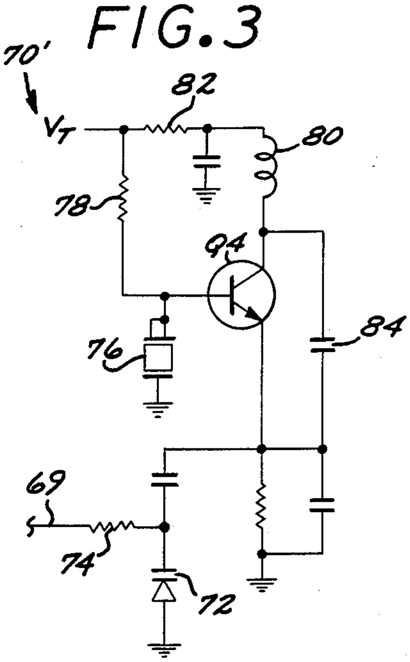
FIG. 4
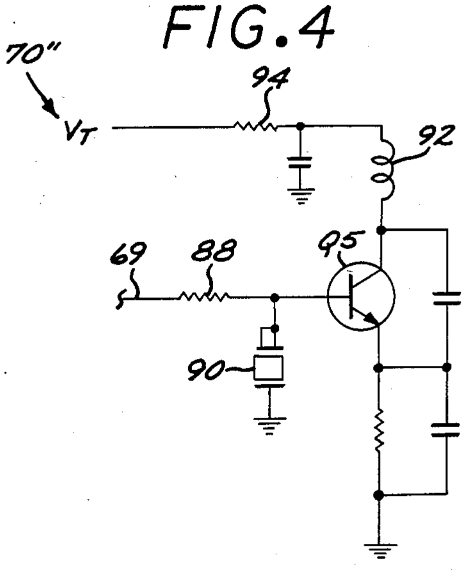

MULTI-CHANNEL REMOTE CONTROL TRANSMITTER

BACKGROUND OF THE INVENTION

The present invention relates to the field of remote control devices, and more particularly to transmitters for remote control of apparatus such as vehicle security systems and garage door opening devices.

Remote control of various electronic and electrical devices via transmitters operating at radio frequencies is now common. For example, vehicle security systems and garage door openers are examples of apparatus commonly controlled by radio frequency (RF) transmitters. Many of the controlled apparatus have a variety of features which may be controlled remotely. For example, vehicle security systems may be armed or disarmed remotely, and various additional features such as actuating the vehicle power door locks, remote engine starting, and the like can be controlled by remote control.

It is desirable that the remote control transmitter be small in size, and preferably suitable for hand-held use. In the case of a vehicle security system, the user may carry the unit on a key chain, so that the transmitter unit is preferably quite small. If the controlled apparatus has only one function that may be remotely controlled, or if the transmitter is to be used to control only a single receiver device, then only one code need be transmitted. In that event, only one control switch is required to operate the transmitter. But as the number of functions to be remotely controlled increases, or if the transmitter is to be used to control more than one receiver apparatus, then the transmitter must be capable of transmitting more than one code. To accommodate the increase in the number of available codes, the complexity of the transmitter controls has also increased.

Typically, to control multiple functions or receivers, the transmitter includes means for transmitting multiple channel codes, the receiver apparatus being responsive to one or more of the different received codes to activate a predetermined function associated with the received code. Conventional transmitters have employed separate function switches or buttons, one for each possible channel. To operate, the user simply pushes the appropriate button to send the particular code signal for a desired function. Thus, where two functions or receivers may be controlled remotely by the transmitter, conventional transmitter devices have employed two push button switches, one for each channel. In another known arrangement for selecting and transmitting one of three channel codes, the transmitter is provided with first and second switches. To transmit a first channel code, the first switch is pressed. To transmit a second code, the second switch is pressed. And to transmit a third code, both switches are pressed. In addition to the limitation of the small number of usable channels, the foregoing transmitter apparatus can be inadvertently activated simply by unknowingly actuating a switch, as when the transmitter is being carried in a pocket or a purse. And as the number of functions increases, it becomes impractical to add many switches since it will increase the size, cost and complexity of the transmitter and its controls.

In another known type of transmitter which provides the capability of selecting and transmitting one of nine possible channel codes, the channel is selected by an electromechanical thumbwheel switch. This transmitter is limited in the number of available channels to the number of different thumbwheel positions (nine). Moreover, the thumbwheel position cannot be seen in the dark by the user, who will therefore not be able to tell which channel has been selected unless the switch is viewed in the light. For vehicle security systems, this is a major drawback, since the user often operates the system at night in unlighted areas.

It is therefore an object of this invention to provide an improved multichannel transmitter for remote control of a plurality of functions or different receiver apparatus.

Another object of the invention is to provide a remote control transmitter which provides the capability of user selection of one of many possible channels with a minimum of control switches.

It is another object of this invention to provide a remote control transmitter which cannot be activated inadvertently.

A further object is to provide a remote control transmitter which provides a signal to the user indicative of the channel selected by the user.

Still another object of the invention is to provide a remote control transmitter which provides a signal to the user indicative of the low battery condition.

Other objects of the invention include providing a transmitter having very high security through a security code comprising a large number of bits, at no increase in the number of output pins of the encoding circuitry, the capability of programming the security code electronically rather than by using switches, punch lines or conductive traces which are selectively scratched, and the capability of providing various security code levels in the same type of devices without an increase in production cost.

SUMMARY OF THE INVENTION

The invention comprises a multi-channel remote control transmitter comprising a transmitter circuit for transmitting an encoded signal, a channel select and a transmit switch each having "on" and "off" states, and a controller. The controller when powered up is responsive to the states of the channel select and transmit switches. In a general sense, the controller comprises means responsive to actuation of the channel select switch for providing a channel select count. In one form, this means provides increments of the channel count each time the channel select switch is pressed and released. In another form, this means provides decrements of the channel count if the channel select switch is held "on" longer than a predetermined time.

The controller further comprises means responsive to actuation of the transmit switch when power is applied to the controller for providing a predetermined channel code in dependence on the present channel count and for actuating the transmitter circuit to transmit a signal encoded with the selected channel code.

In accordance with another aspect of the invention, the transmitter further includes a nonvolatile memory for storing an M-bit digital transmitter base code, with the least significant N bits of the base code set to zero. The controller includes means for reading the base code from the memory each time the transmitter unit is powered up. The controller determines the code to be transmitted from the base code and the present channel count, with the N least significant bits of the transmit code being assigned values in dependence on the present channel count.

The transmitter includes circuitry for automatically applying power to the transmitter from a battery when the channel select switch is "on" until a predetermined time duration after the last switch actuation. The transmitter also includes circuitry that audibly alerts the user whenever the battery voltage level falls below a predetermined level. The transmitter includes circuitry that prevents an inadvertent transmission since it will require the activation of the channel select and transmission switches in tandem, and within a few seconds of each other. Any other sequence will not enable the transmission.

To provide information to the user indicating the present channel count, and to indicate the channel code being transmitted, a signal generator device is provided. This device may include an audio signal generator, a visible count display or the like. The audio signal generator generates a "beep" each time the channel count is incremented or decremented, and generates a number of "beeps" corresponding to indicating the channel code being transmitted.

In another form, when a large number of channels and rapid channel selection is desired, the channel select control may further include a channel select decade switch for incrementing or decrementing the present channel count by ten, in addition to the single channel increment/decrement switch.

BRIEF DESCRIPTION OF THE DRAWINGS

These and other features and advantages of the present invention will become more apparent from the following detailed description of exemplary embodiments thereof, as illustrated in the accompanying drawings, in which:

FIG. 1 is a perspective view of a remote control transmitter embodying the invention.

FIG. 3 is a circuit schematic of an FM transmitter section which may be employed in the arrangement of FIG. 2 to provide an FM transmitter.

FIG. 4 is a circuit schematic of an AM transmitter section which may be employed in the arrangement of FIG. 2 to provide an AM transmitter.

DETAILED DESCRIPTION OF THE DISCLOSURE

Figure 2:
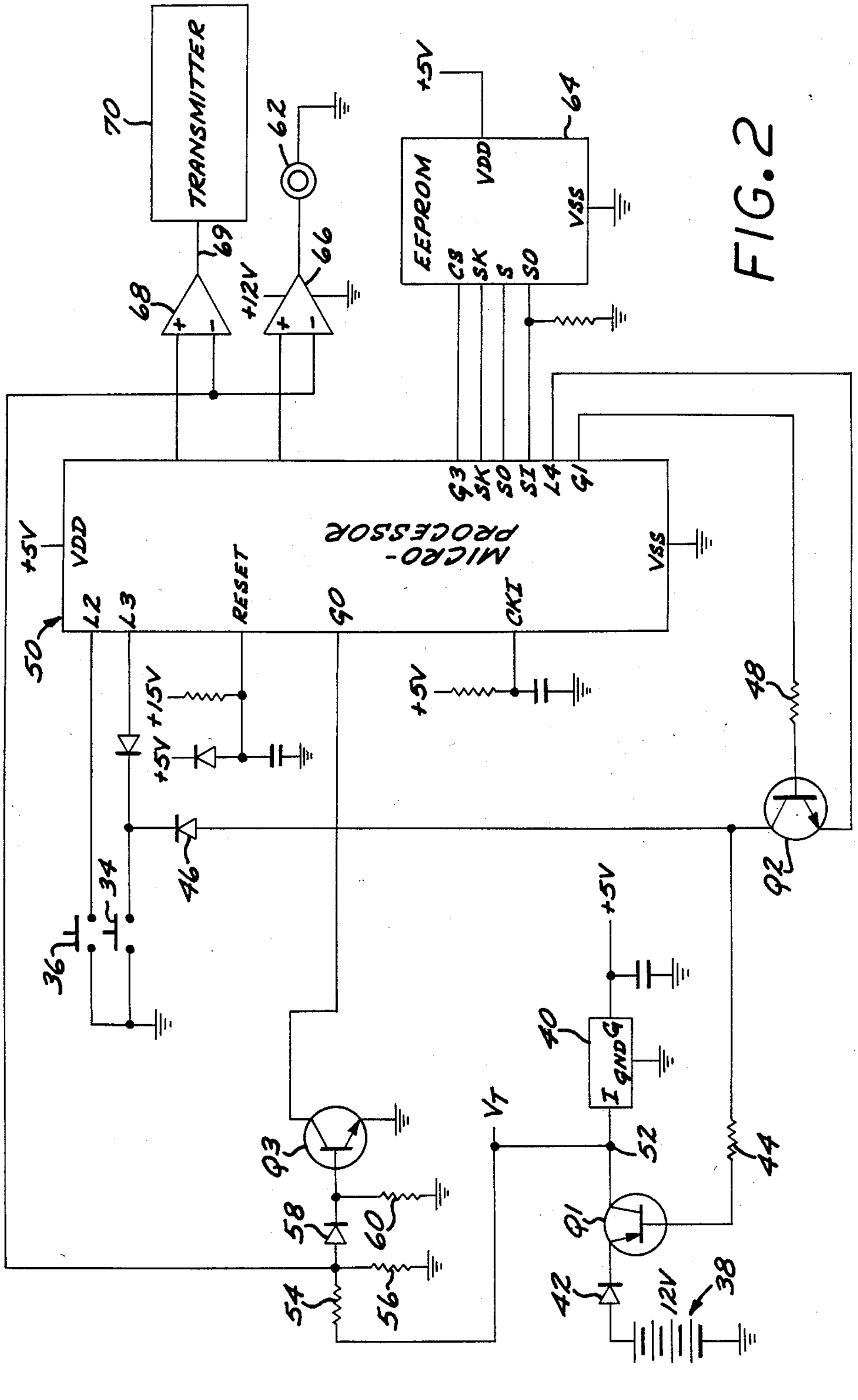
FIG. 2 is a simplified circuit schematic of the remote control transmitter of FIG. 1.

FIG. 1 shows a perspective view of a remote control transmitter device 30 embodying the invention. The transmitter includes a housing 32 suitable for hand-held use, and two user-actuated switches 34 and 36 mounted for convenient access by the user. Switch 34 is the "channel select" switch, and switch 36 is the "transmit" switch. In this embodiment, each switch 34 and 36 comprises a simple two position switch or button, each having "on" (closed) and "off" (states), and are spring-loaded to the off position. By actuation of these switches, i.e., by pressing the switch button, the user is able to select a desired channel code using the channel select switch 34, and thereafter to transmit the selected channel code using the transmit switch 36. No other switches are required to operate the transmitter device 30.

The maximum number of channel codes is not limited by the transmitter switch control elements, although the particular embodiment described with respect to the FIG. 2 provides the capability of selecting and transmitting sixteen possible codes. A higher number of available channel codes may be readily implemented.

FIG. 2 shows a simplified schematic of the circuit elements comprising the transmitter 30. The transmitter 30 comprises a controller 50, in this embodiment an 8-bit microprocessor. The switches 34 and 36 are coupled respectively to terminals L3 and L2 of the controller 50, and provide a path to ground for the respective terminal when the switch is pressed closed, i.e., when the switch is conductive. The controller 50 determines the on/off status of the respective switches by monitoring the status of the terminals L2 and L3.

Power is supplied to the transmitter 30 by a miniature 12-volt battery 38. A voltage regulator 40 is coupled to the battery 38 through diode 42 and transistor Q1, and provides a regulated 5 volt power supply level when the transistor Q1 is conductive. The transmitter 30 comprises means for automatically applying electrical power to the circuits in response to user actuation of the channel select switch, means for maintaining power to the transmitter circuits while a code is being selected and transmitted, and means for automatically turning the power to the transmitter circuits off after the user has finished using the transmitter.

To conserve battery power, the transmitter circuitry is not powered unless the channel select switch 34 has been actuated on by the user, which automatically applies power to the controller 50. The base of transistor Q1 is coupled to the channel select switch 34 via resistor 44 and diode 46. When switch 34 is closed, a path to ground is provided for the base current for transistor Q1, resulting in the transistor Q1 being gated to the conductive state and connecting the battery 38 to the regulator 40. Thus, when the switch 34 is closed by the user, this immediately supplies power to the transmitter circuits, including controller 50.

As soon as power is provided to the controller 50, the controller initializes operation and provides an active high signal on terminal G1 and a low signal on terminal L4. Terminal G1 is coupled to the base of transistor Q2 through resistor 48, and terminal L4 is connected to the emitter of transistor Q2. Thus, a high signal on terminal G1 and a low signal on terminal L4 gates the transistor Q2 to the conductive state. The emitter of transistor Q2 is coupled to the base of transistor Q1 via resistor 44, and provides a second path to ground for the base current for transistor Q1, thereby keeping transistor Q1 turned on in the conductive state even after the channel select switch 34 is released by the user.

If the channel select switch 34 is released, the controller 50 can turn off the power to the transmitter 30 by bringing terminal G1 to the low state and terminal L4 to the high state. This turns off transistor Q2, so that transistor Q1 will also be turned off (unless the channel select switch 34 is closed). As will be discussed more fully below, the transistor 30 will automatically turn off the power to the controller 50 three seconds after a switch 34 or 36 has been closed.

The transmitter 30 further comprises a means for warning the user that the battery 38 voltage is low. Node 52, the collector of the transistor Q1, is at substantially the battery voltage when the transistor Q1 is conductive. Node 52 is connected to a voltage divider circuit comprising resistors 54, 56 and 60, and the base of the transistor Q3 is driven by the divided battery voltage. If the divided battery voltage falls below the level needed to drive the transistor Q3 to the conductive state, the terminal G0 of the controller 50 will not be coupled to ground. If the transistor Q3 is conductive, terminal G0 will be connected to ground. The voltage divider circuit element values are selected to cause the transistor Q3 to be turned off when the battery voltage drops to a predetermined voltage below the nominal voltage of 12 volts, say 8 volts. When the transmitter 30 is powered up with a battery voltage insufficient to turn on transistor Q3, then the transmitter provides a signal to the user that the battery voltage is low. For example, in this embodiment, the controller 50 activates a piezoelectric audio transducer device 62 through terminal L0 to sound ten short "beeps" if the transistor Q3 is turned off when the transmitter is powered up to indicate that the battery voltage is low. A single "beep" is sounded when the transistor Q3 is turned on when the transistor is powered up, indicating that the battery voltage is at a satisfactory level.

The transmitter 30 further comprises an electrically erasable programmable read only memory (EEPROM) 64 which is connected to terminals G3, SK, SO, SI of the controller 50. The EEPROM 64 is programmed by the transmitter manufacturer to store a digital base code for the particular transmitter unit. In this embodiment, the base code is a 32-bit byte wherein the least significant five bits are zero. Preferably each transmitter unit has its own unique base code. For example, the manufacturer may randomly select a unique base code for each unit manufactured, wherein the 27 most significant bits are selected randomly. With the full 32 bits, over four billion possible channel codes are available.

The piezoelectric transducer 62 is driven by operational amplifier 66, which is controlled by terminal L0 of the controller 50. By turning the terminal L0 on and off the piezoelectric device 62 can be made to generate an audible sound, i.e., a beep-like sound. This device 62 is activated each time the channel count has been incremented (or decremented) by actuation of the channel select switch 34, and also when a code is transmitted. The transducer 62 is activated to generate a signal indicating the channel count, and to indicate the particular transmitted channel code. Other means for signalling this information to the user may be employed. For example, a liquid crystal display (LCD) may be employed to display the channel count. Such a display may replace the piezoelectric transducer 62, or be used in addition to the transducer 62.

The transmit output of the controller 50 is provided at terminal G2, and is activated only in response to the closing of the transmit switch 36 when power is applied to the transmitter circuits. The terminal G2 is connected to operational amplifier 68, which acts as a level shifting buffer and provides a signal of a level appropriate to drive the transmitter section 70 comprising the transmitter 30. The controller output at terminal G2 is a serial 32-bit transmit byte. In this embodiment, the base code read from the EEPROM 64 comprises the 27 most significant bits of the transmit word. The least significant 5 bits of the transmit word correspond to the present channel count as entered through the channel select switch 34. For example, say that the channel select switch is pressed five times, and then the transmit switch is pressed. In this case, channel 5 has been selected. The resulting transmit word is a 32 bit word wherein the most significant 27 bits are the 27 bits of the base code, and five least significant bits are 00100.

The transmitter section 70 may comprise either a frequency modulated transmitter section 70' such as is shown in FIG. 3, or an amplitude modulated transmitter section 70" such as is shown in FIG. 4. The center frequency of both the FM and AM transmitter section is 303.3 Megahertz. The controller 50 generates the 32 bit transmit byte on the output terminal G2, with a bit period of three milliseconds. For either FM or AM transmission, if the bit is a digital "zero," there is an initial 500 microsecond "on" time for the signal at terminal G2, followed by a 2500 microsecond "off" interval. To represent a digital "one," the signal at terminal G2 has a 2500 microsecond "on" time, followed by a 500 microseconds "off" time. After generating the 32 bit transmit word at terminal G2, there is a 60 millisecond off or "dead" period. The transmit word will thereafter be repeated if the transmit switch is in the conductive state.

The FM section 70' shown in FIG. 3 is driven by the buffer 68 output on line 69 (FIG. 2), and comprises a capacitor 72 coupled to the buffer output by a resistor 74, a transistor Q4 whose base is biased by bias circuitry comprising a SAW (surface acoustic wave) resonator 76 coupled to ground and resistor 78 coupled to the node $V_t$ (FIG. 2). The collector of transistor Q4 is coupled to node $V_t$ via inductor 80 which serves as the transmitter antenna loop. The emitter and collector of the transistor Q4 are coupled together by capacitor 84. The transistor Q4 oscillates in dependence on the circuit element values.

The transmitter section 70' relies on the changing of the voltage across the capacitor 72 to vary the frequency of oscillation of the transistor Q4. The center frequency of oscillation of the transmitter section 70 is determined by the SAW (surface acoustic wave) resonator device 74. The buffer output 68 has two possible states, low and high. The low state results in oscillation at the center frequency. The high buffer state results in oscillation at another frequency offset from the center frequency. As is well known in the art, the receiver which is responsive to the transmitted signal comprises a frequency discriminator for detecting signals at either the center frequency or the offset frequency and decoder circuitry for converting the discriminator output into a digital signal replicating the transmit digital byte.

Alternatively, the transmitter section 70 may comprise the AM transmitter section 70" shown in FIG. 4. The code scheme for AM transmission also employs a 3 millisecond bit period. The carrier amplitude is essentially "on" or "off," depending on the output of the buffer 68. Each digital "zero" value is represented by the carrier amplitude being "on" for 500 microseconds only of the bit period, and "off" for the remainder of the period. Each digital "one" value is encoded by the carrier amplitude being "on" for 2500 microseconds of the bit period, with the carrier amplitude turned "off" the remainder of the bit period.

The AM transmitter section 70" comprises a transistor Q5 which oscillates at a center frequency determined by the SAW resonator 90. The buffer 68 output on line 69 is coupled to the base of the transistor Q5 via resistor 88. The collector of the transistor is coupled to node $V_t$ by inductor 84, also serving as the antenna loop. Therefore, when the buffer 68 output is low, the transistor Q5 is turned off, so that substantially no carrier power is radiated. And when the buffer output is high the transistor Q5 is turned on, and oscillates at the center frequency established by the resonator 90. The modulation factor is therefore either 100% or 0%.

Operation of the Transmitter-Initialization

The operation of the transmitter 30 is shown more fully by the flow diagrams of FIGS. 5A–5H. As will be appreciated by those skilled in the art, the microprocessor comprising the controller 50 is programmed with instructions implementing the functions indicated in the flow diagrams. The "main loop" of the operation is shown in FIGS. 5A–5D, with the 3 second transmitter "power on" timer being initiated at step 100. The function at step 102 indicates the background or interrupt-driven housekeeping functions (depicted in FIGS. 5E–5H) being performed on a 20 millisecond tick basis. At step 104 the controller terminal G0 is checked to determine if the battery low voltage condition exist. If low battery voltage is indicated, then ten distinct beeps are sounded by the piezoelectric transducer 62 (step 108). If the low voltage condition is not indicated, then a single beep is generated (step 106), indicating the battery voltage is at an acceptable level.

At step 110, the transmitter base code is read from predetermined locations in the EEPROM 64. This is the 32-bit code randomly assigned to the particular transmitter unit by the manufacturer, with the least significant five bits set to zero. The controller 50 also reads predetermined locations in the EEPROM for the 2 SEC XMTR ENABLE and DECREMENT DISABLE flags, to determine whether either flag has been set. The two flags determine whethe the particular features associated with these flags are enabled for the particular transmitter unit. The first feature limits continuous transmission to a maximum duration of two seconds, to comply with regulations in certain regions. The second flag, the DECREMENT DISABLE flag, determines whether the channel select switch 34 may be employed to decrement the channel count in addition to incrementing the channel count. At this point the controller 50 has been initialized, and it is now ready to receive input data from the switches 34 and 36. Operation then essentially waits at step 112 until new switch input data is received.

Figure 5A:
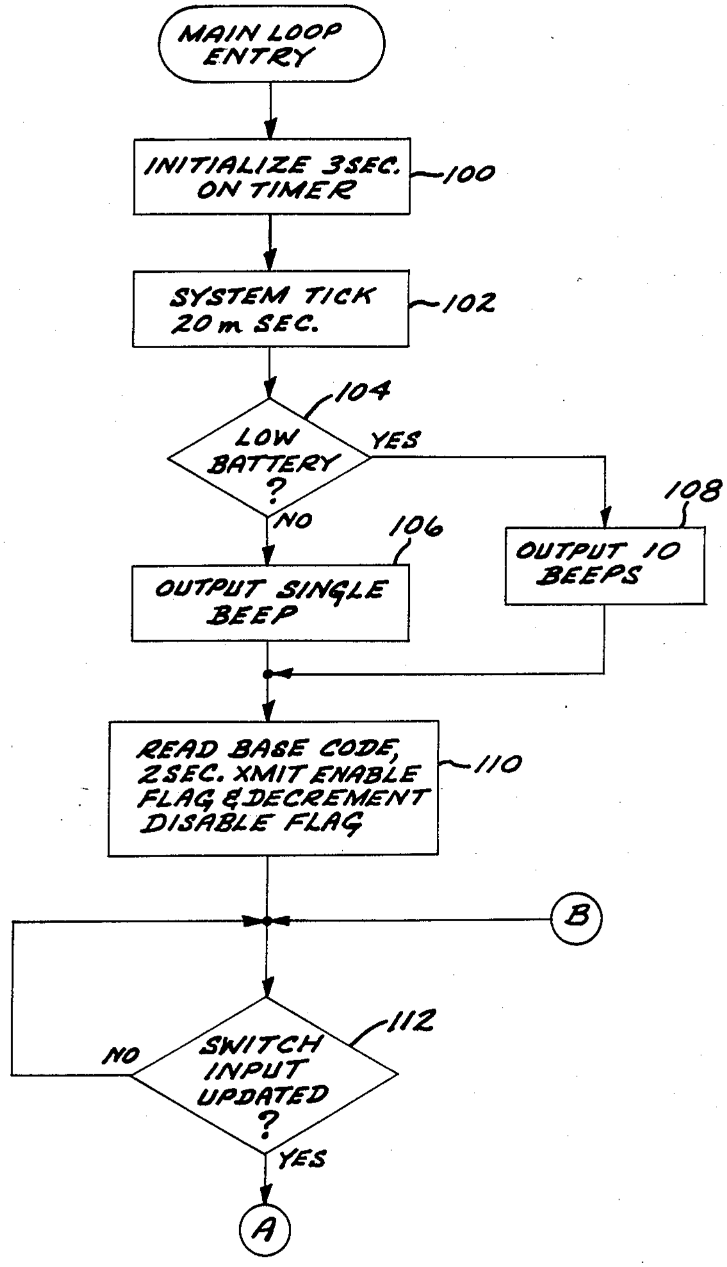
FIGS. 5A–5H are simplified flow diagrams illustrating the operation of the remote transmitter of FIGS. 1 and 2.
Figure 5B:
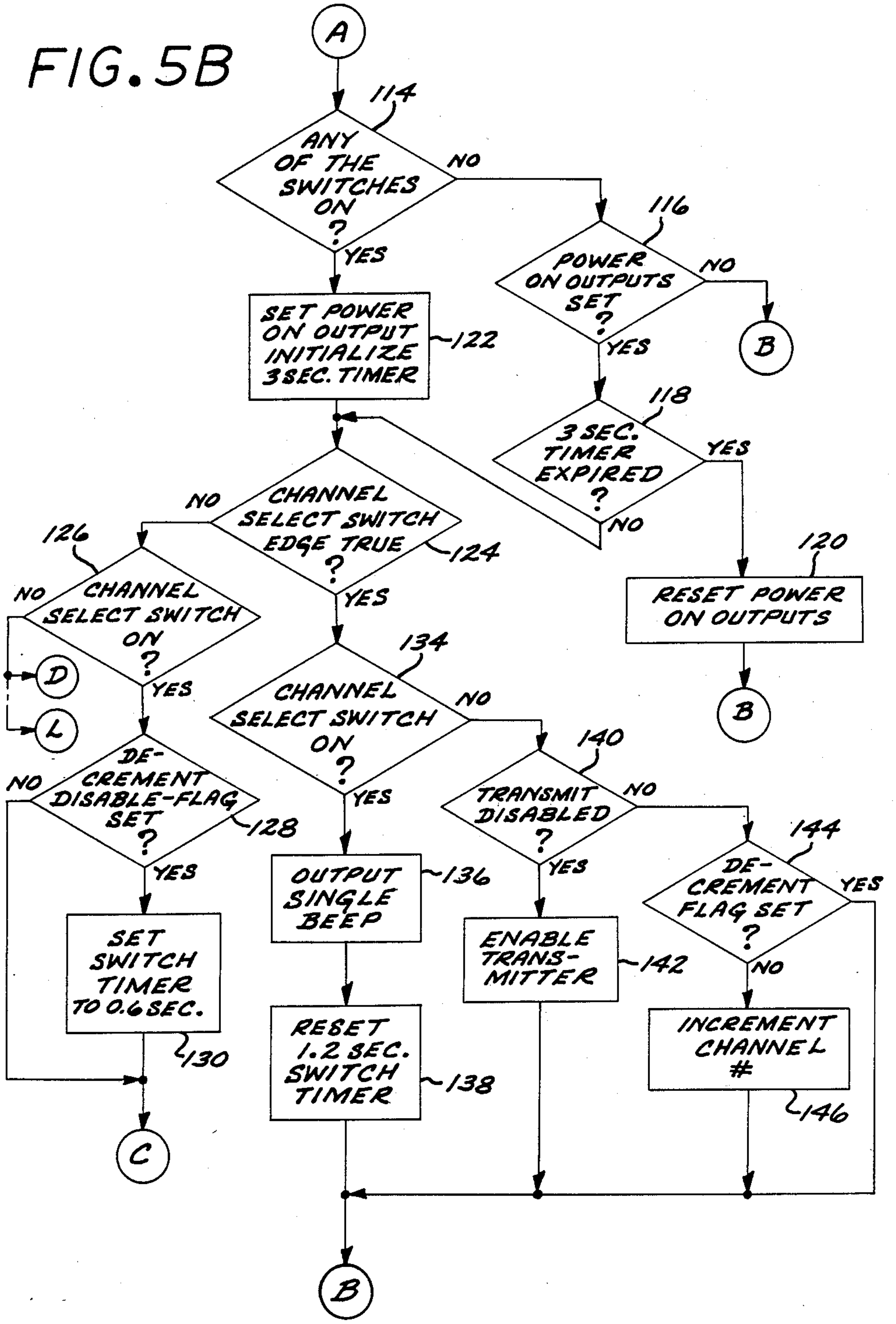

Once new switch information has been received, i.e., indicating that the status of either the channel select switch 34 or the transmit switch 36 has changed, then at step 114 (FIG. 5B) the information is tested to determine whether any of the switches are in the on (closed) position. If no switch is on, operation will return to step 112 if the "power on" outputs of the controller 50 are not set, i.e., if the output G1 is low and L4 is high. If the "power on" outputs are set, then at step 118 the 3 second timer is checked and if it has expired, the power on outputs are reset, i.e., the G1 terminal is brought low and the L4 terminal is brought high to turn off transistors Q2 and Q1. Operation then returns to step 112 (FIG. 5A). If the three second timer has not expired, operation proceeds to step 124.

Channel Select Switch Operation

If one of the switches is "on" (conductive) at step 114, then at step 122 the "power on" outputs of the controller 50 are set (terminal G1 high, terminal L4 low) to turn on transistor Q2, and the three second timer is initialized. At step 124, the channel select switch 34 is checked to determine whether it has just been pressed or released, i.e., whether the terminal L3 signal is at an edge. If not, then, at step 126, if the channel select switch is not "on," operation proceeds to point D, step 160 at FIG. 5D, to check the transmit switch 36 and transmit a code if appropriate. If the channel select switch 34 is "on," the DECREMENT DISABLE flag is checked at step 128 to determine if the channel count decrementing feature has been disabled. If the flag is set, the decrement feature has been disabled, and actuation of the channel select switch will only increment the channel count. In this case, switch timer is set to 0.6 seconds (step 130), and operation proceeds to point C, step 150 at FIG. 5C.

If the determination at step 124 is true, i.e., the channel select switch 34 was just pressed or released, then the channel select switch 34 is checked at step 134, and if "on," a single beep is output (step 136), the switch timer is reset to 1.2 seconds (step 138) and operation proceeds to point C. The purpose for setting the timer to 1.2 seconds here is to provide a relatively long first interval after the switch 34 is pushed before the count will be decremented. Thereafter, if the switch is continuously "on," decrementing will occur twice as fast, every 0.6 seconds until the switch 34 is released. If the channel select switch 34 is not "on," then the transmit operation is checked to determine whether it has been disabled (step 140) because the feature limiting maximum transmit duration to two seconds is enabled, and the transmit duration exceeded two seconds. If the transmit operation has previously been disabled, the transmitter output G2 of the controller 50 is enabled, and operation proceeds to point C. If the transmit operation has not been disabled then the DECREMENT flag is checked and if not set, the channel count is incremented. Operation then proceeds to point C.

Figure 5C:
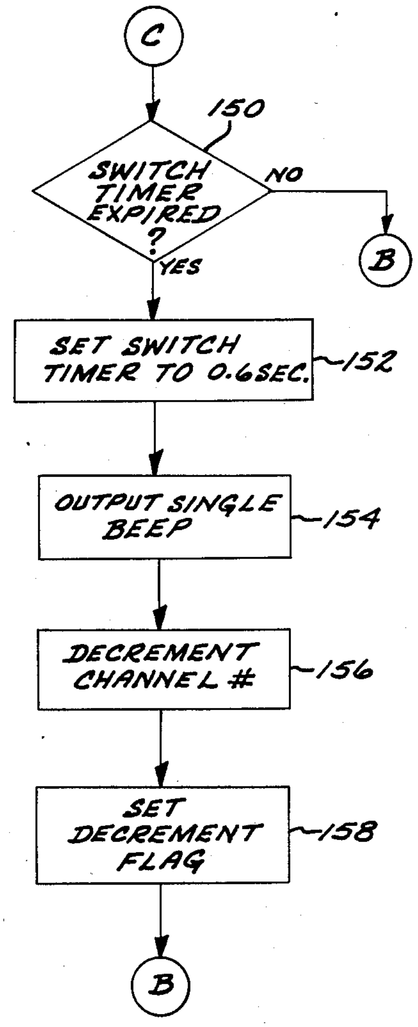

Referring now to FIG. 5C, at step 150, the switch timer is checked to see if the channel select switch has been continuously "on" for a time duration exceeding the timer duration. If the switch timer has not expired, operation proceeds to step 112 (FIG. 5A). If the timer has expired, then the switch timer is set to 0.6 seconds (step 152), a single beep is generated (step 154), the channel count is decremented (step 156) and the DECREMENT flag is set (step 158). Operation then returns to step 112.

Transmit Switch Operation

Figure 5D:
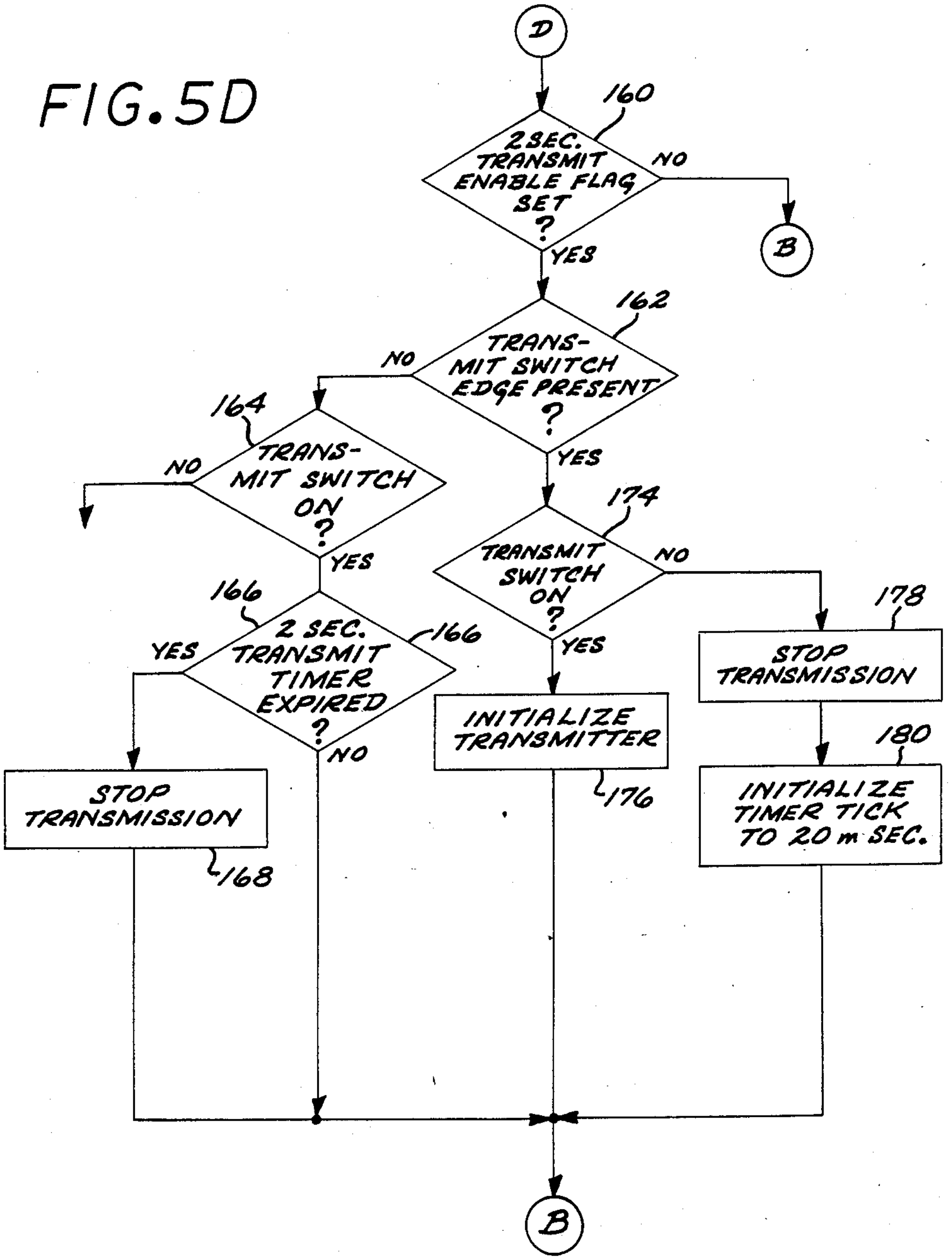

If the channel select switch 34 was not on at step 126, then operation proceeds to step 160 (FIG. 5D). Here, if the 2 SEC TRANSMIT ENABLE flag is not set, then operation returns to step 1112 (FIG. 5A). If the flag is set, then the transmit switch terminal L2 of the controller is checked to see if the transmit switch 36 was just pressed or released (step 162). If not, then the transmit switch status is checked at step 164 and if it is not on, operation returns to step 112. If the transmit switch is on, then the two second transmit timer is checked, and if it has expired the transmit operation is stopped (step 168). Otherwise, operation proceeds to point K, step 182 at FIG. 5E for generating sound beeps indicating the channel code now being transmitted.

If at step 162, the transmit switch has just been pressed or released, its status is checked at step 174, and if it is "on," then at step 176, the transmitter is initialized and operation returns to step 112. If the transmit switch is not on, then the ongoing transmission is stopped at step 178, the interrupt tick timer is initialized to 20 milliseconds and operation returns to step 112.

Figure 5E:
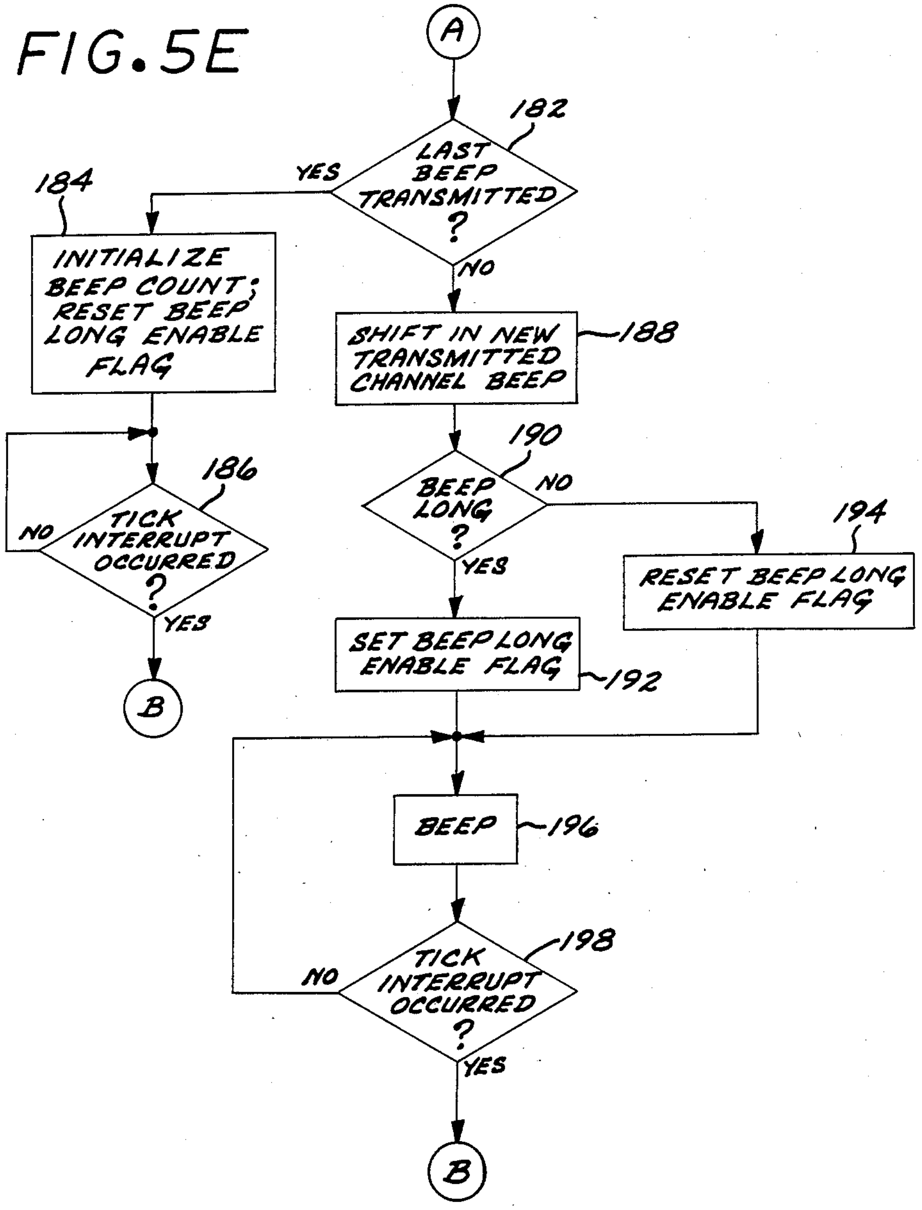

Referring now to FIG. 5E, step 182 is accessed from step 166, i.e., with the transmit switch on and the 2 second timer not expired. FIG. 5E illustrates the generation of signals indicating the channel count now being transmitted. In this embodiment, there are sixteen possible channels. To facilitate audible indication to the user of the particular channel code being transmitted, i.e., one of the channels 1–16, long and short beeps are employed. Each long beep indicates a count of five, and each short beep a single count. Thus, for example, a transmit channel count of four is indicated by four short beeps, a count of eight is indicated by one long beep and three short beeps, and a count of sixteen by three long beeps and a single short beep. Thus, for a relatively high count, the user need not accurately count many short beeps. The short beeps are transmitted between transmissions of successive code bytes, i.e., during the 60 millisecond "dead" period between successive byte transmissions. The long beep duration can occur during byte transmission as well as during the "dead" period.

The determination is made at step 182 whether the last beep for the selected channel code transmit byte has been transmitted since the transmit switch was actuated. If yes, then the beep count is initialized and the BEEP LONG ENABLE flag is reset (step 184). Operation then waits at step 186 until the next tick interrupt occurs, and then returns to step 112 (FIG. 5A). If the last beep has not been sounded, then at step 188 the new transmit channel beep data indicating either a short or long next beep is shifted into the output register for the piezoelectric control terminal. At step 190 the new beep information is checked to see if the new beep is a long beep, and if yes, the BEEP LONG ENABLE flag is set at step 192. If the next beep is a short beep, then the BEEP LONG ENABLE flag is reset at step 194. The selected long or short beep is sounded at step 196. Operation loops back to step 196 until the next tick interrupt occurs (step 198), when operation returns to step 112.

The Interrupt Routine

Figure 5F:
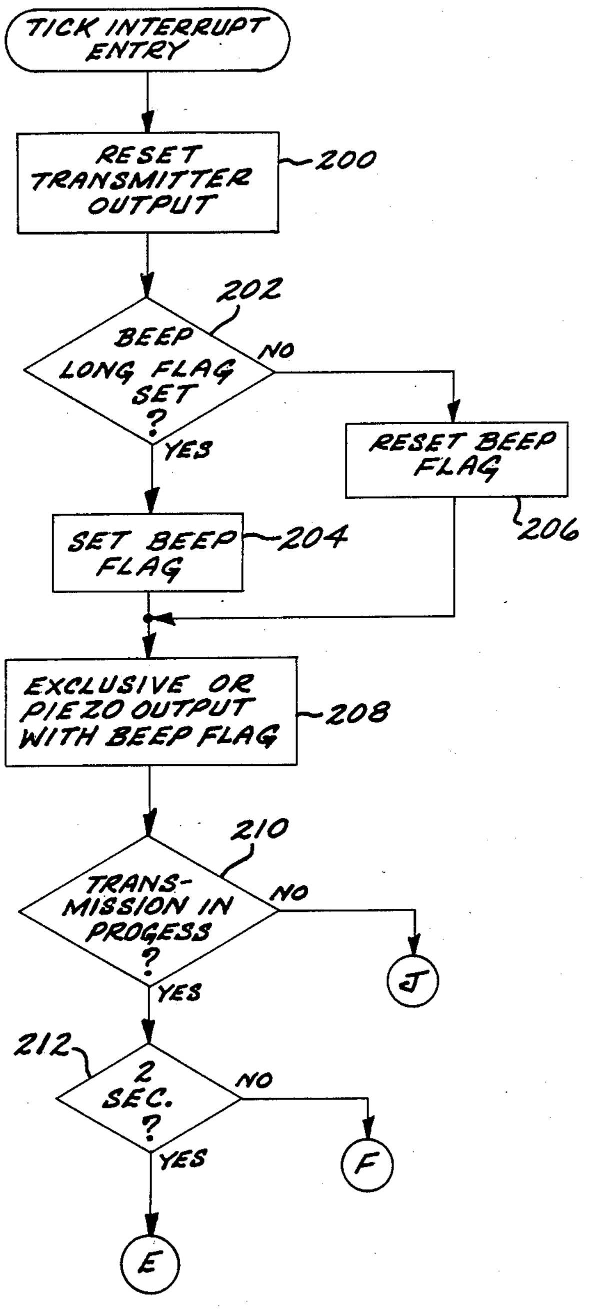
Figure 5G:
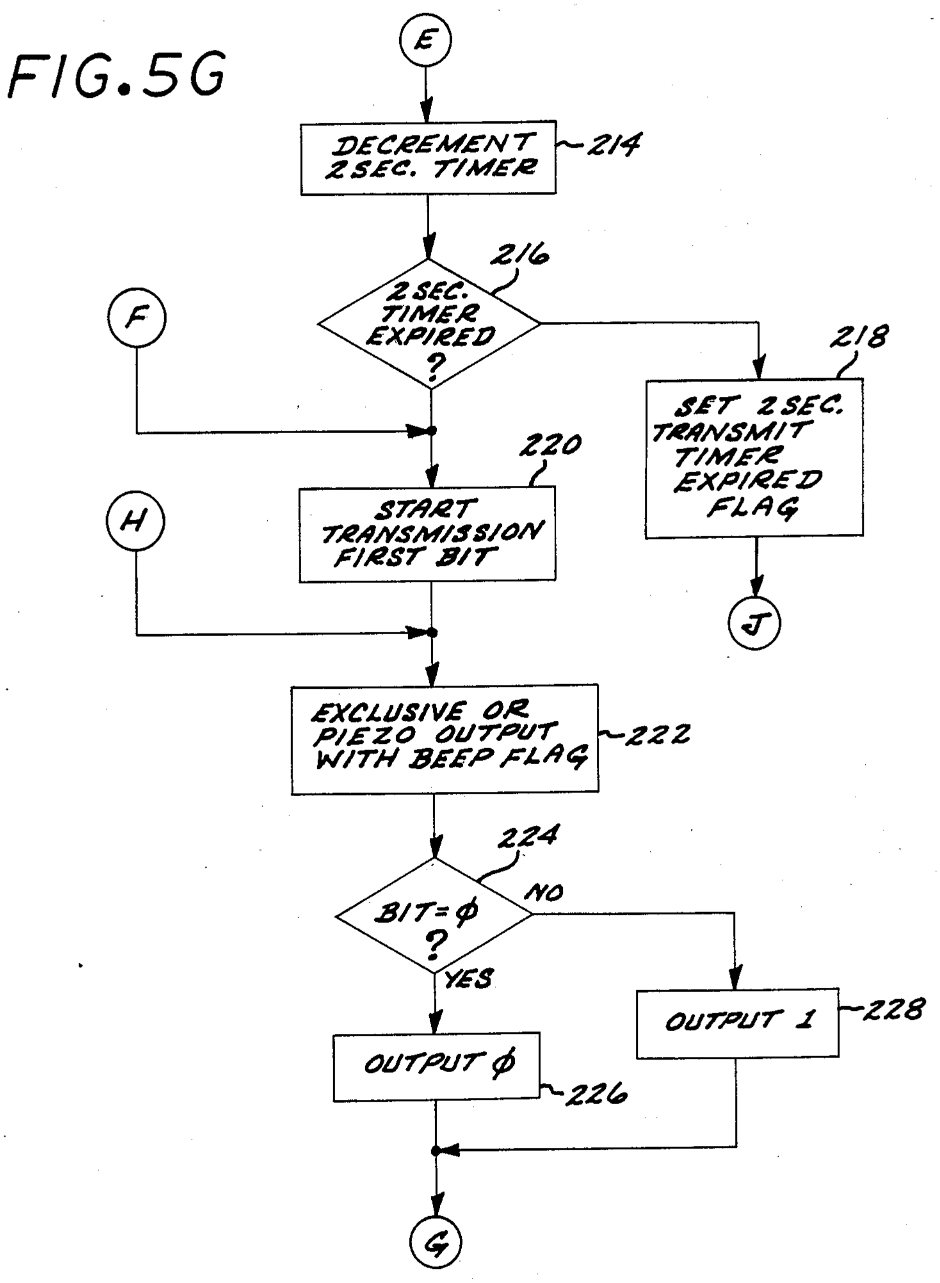
Figure 5H:
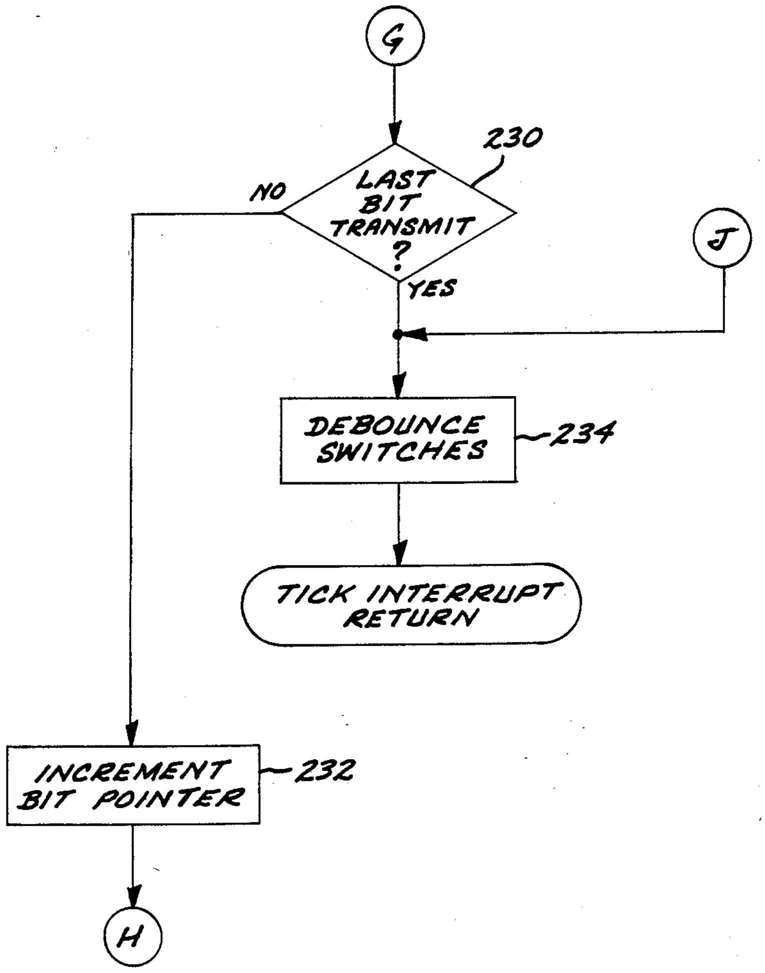

Referring now to FIGS. 5F–5H, the tick interrupt routine for the controller 50 is depicted. At the outset of the interrupt routine, which occurs every 20 milliseconds, the transmitter output terminal G2 is reset. If the BEEP LONG flag has been set (step 202), then the BEEP flag is set (step 204). If the BEEP LONG flag has not been set, then the BEEP flag is reset (step 206). (short beeps do not require the interrupt capability since they occur between successive transmit bytes.) At step 208 the controller 50 performs a logical Exclusive OR function on the controller piezoelectric control signal and the BEEP flag such that unless the BEEP flag is set, no piezoelectric output is provided at terminal L0. Thus, a long beep may be generated, unless the BEEP flag is reset. At step 210, if a transmission is not in progress, operation proceeds to point J, step 234, FIG. 5H, to debounce the switches and return to the main loop operation. If a transmission is in progress, then the 2 SEC XMIT ENABLE flag is checked and if set, operation proceeds to step 214 (FIG. 5G) to decrement the two second timer. If the flag is not set, then operation proceeds to step 220 (FIG. 5G), bypassing the timer decrement state.

At step 214, the 2 second timer is decremented, and if it has expired (step 216), the 2 SEC TRANSMIT TIMER EXPIRED flag is set (step 218), the switches are debounced at step 234 (FIG. 5H) and the interrupt operation returns to the main loop. If the timer has not expired, then the transmission of the first bit of the transmit byte is started at step 220. The piezoelectric control signal is logically Exclusive OR'd with the BEEP flag at step 222 so that no piezoelectric output occurs at terminal L0 unless the flag is set. At step 224, if the first bit being transmitted is a "zero" bit, then the controller terminal output G2 provides the "zero" bit code scheme discussed above (step 226). If the bit is a "one," then the terminal output provides the "one" bit code scheme (step 228).

Referring now to FIG. 5H, if the last bit of the transmit byte has been transmitted (step 230), then the switches are debounced at step 234 and the tick interrupt routine returns to the main loop operation. If the last bit in the transmit byte has not been transmitted, the bit pointer is incremented, and operation branches to step 222 (FIG. 5G) to transmit the next bit.

Figure 6:
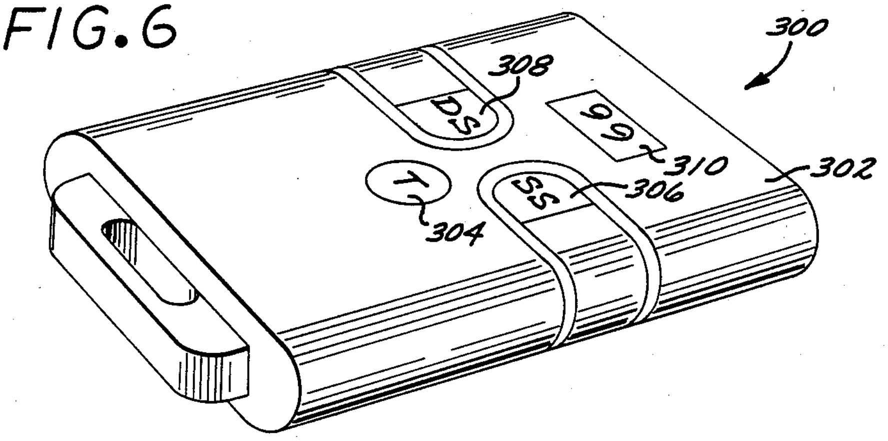
FIGS. 6–8B illustrate another embodiment of the invention.

A second embodiment of the invention is shown in the perspective view of FIG. 6. The transmitter 30 includes a housing 302 and a transmit switch 304 as in the transmitter 30 of FIG. 1, but instead of a single channel select switch, both a single channel select switch 306 and a channel decade select switch 308 are provided. A digit display 310 is also provided for providing a visual display of the present channel count when the transmitter is powered up, and of the particular channel code being transmitted during transmission. Except for the decade switch 308 and the display 310, the operation of the transmitter 300 is similar to that of transmitter 30.

Figure 7:
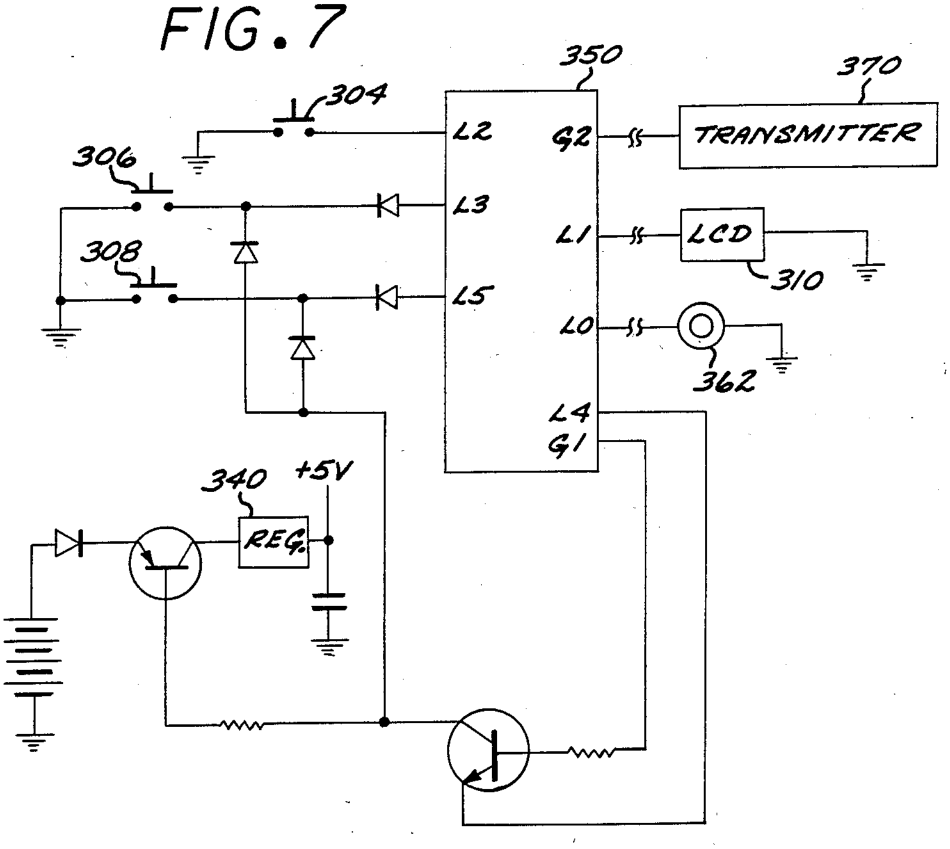

A simplified schematic block diagram of the circuitry of transmitter 300 is shown in FIG. 7, with the low battery voltage detector circuitry and various output buffers omitted for clarity. The transmitter comprises a controller 350 and the three switches 304, 306 and 308. Actuation of either channel select switch 306 or 308 switches power "on" in a similar fashion as described with respect to the transmitter 30 of FIG. 2. The transmitter section 370 is identical to that of FIG. 2. Means allowing the controller to turn off the power if neither switch 306 or 308 is pressed are also provided. The controller 350 controls the display 310, preferably an LCD device, and the piezoelectric transducer 362. The LCD device 310 shows the present channel count during operation of the transmitter.

The controller 350 is responsive to the switches 306 and 308 to increment the present channel count either by one or by ten, depending on which switch is actuated. This facilitates the use of the transmitter for selecting higher channel counts. Thus, instead of only sixteen possible codes, this embodiment is well suited to controlling a high number of channels, say 99 or more. The transmit byte can, in that example, comprise 32 bits, with the most significant 25 bits being assigned randomly by the manufacturer, and the least significant 7 bits being assigned in dependence on the present channel state, thereby allowing up to 128 channels.

Figure 8A:
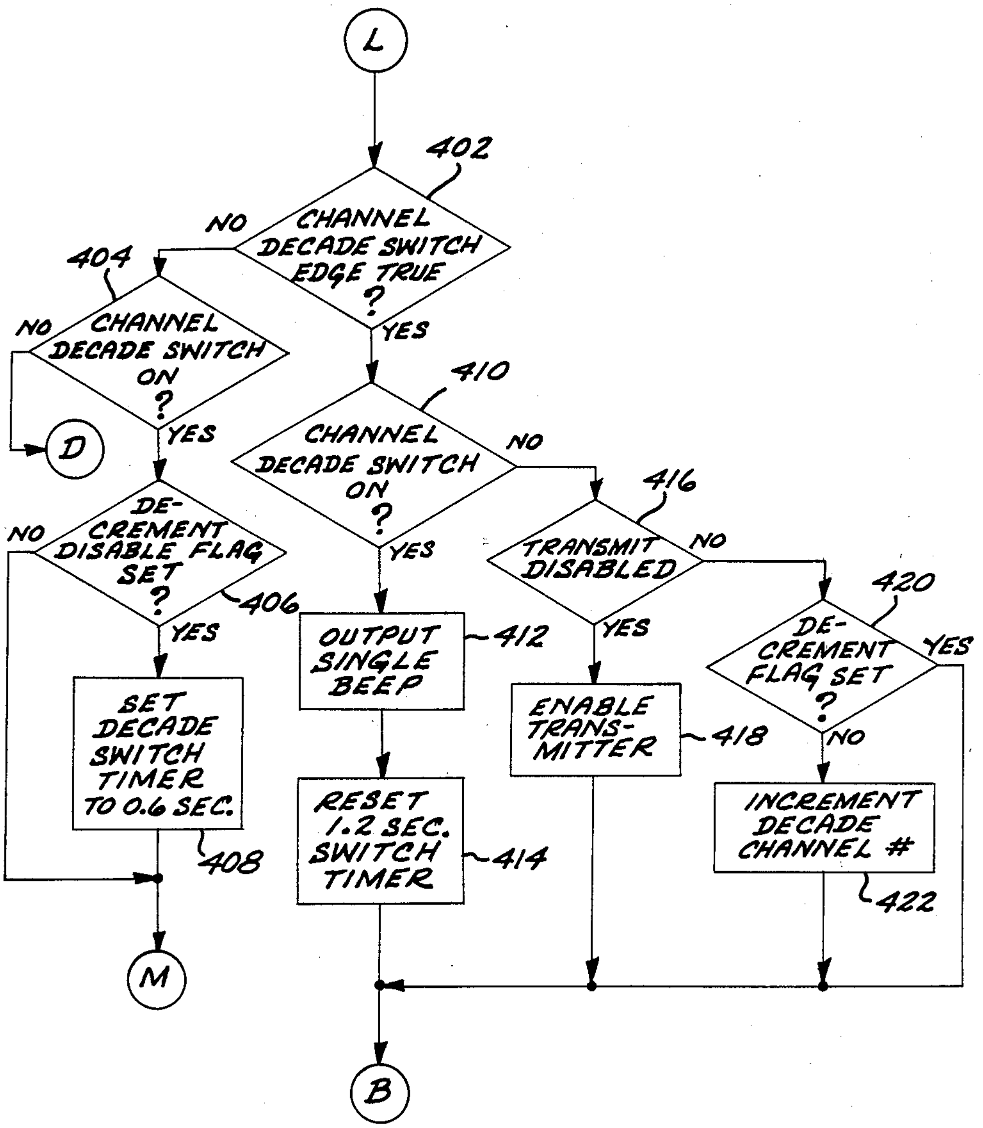
Figure 8B:
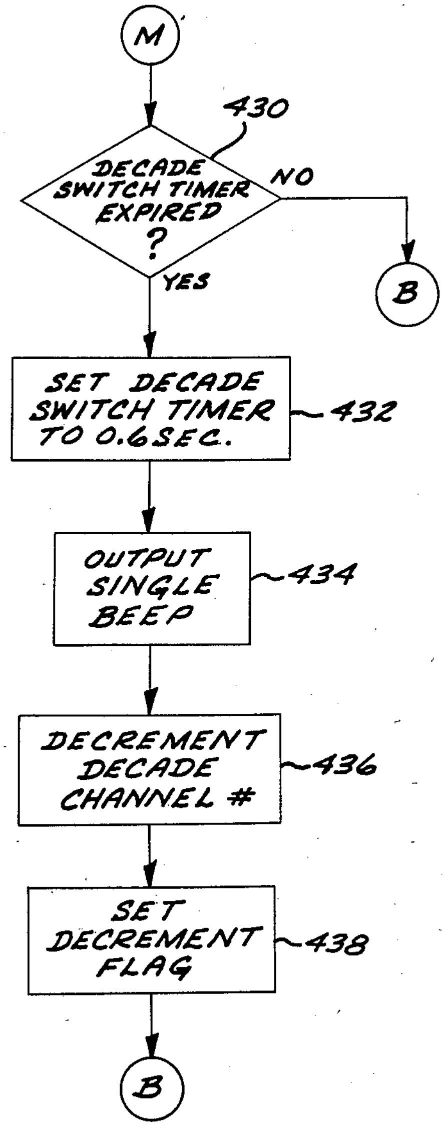

The operation of the embodiment of FIGS. 6 and 7 is quite similar to that of the embodiment of FIGS. 1–5, except that the decade switch 308 provides additional channel selection capability. The flow diagrams of FIGS. 8A–8B illustrate this additional capability. The flow diagrams of FIGS. 5A–5H illustrate the operation of the transmitter 300 as well, with the diagrams of FIGS. 8A–8B showing the additional feature of the decade channel select switch 308. Thus the operations illustrated in FIGS. 5A–5H are also employed in the transmitter 300, except that at FIG. 5B, step 126, if the channel select switch (i.e., the single channel select switch 306 of transmitter 300) is not on, then operation proceeds to point L, FIG. 8A, instead of to point D, FIG. 5D. This is illustrated by the phantom line indication to point L adjacent step 126 of FIG. 5B. The steps following point L, FIG. 8A, are analogous to steps 124–146 of FIG. 5B. Thus, at step 402, if the decade switch 308 is not at an edge condition, i.e., being pressed or released, then at step 404, if the decade switch is not on, operation proceeds to point D, FIG. 5D. If the decade switch 308'is on, then the decrement disable flag is checked, and if not set, operation proceeds to point M, FIG. 8B. If the flag is set, then at step 408, the decade switch timer is set to 0.6 seconds, and operation proceeds to point M.

If at step 402 the decade switch is at an edge condition, then if the switch is on (step 410), a single beep is output at step 412, the switch timer is reset to 1.2 seconds (step 414), and operation proceeds to point B, FIG. 5A. If the decade switch is not on, then at step 416, if the transmit operation is disabled, the transmitter section will be enabled at step 418, with operation proceeding to point B. If the transmit operation is not disabled, then at step 420 the decrement flag is checked, and if set, operation proceeds to point B. If the flag is not set, then the channel count is incremented by ten (step 422), with operation thereafter proceeding to point B.

Point M is shown in FIG. 8B, and is accessed from step 408 (FIG. 8A). Here, at step 430, if the decade switch timer has not expired, then operation proceeds to point B. If the timer has expired, then at step 432 the decade switch timer is set to 0.6 seconds, a single beep is output (step 434), the channel count is decremented by ten (step 436), the decrement flag is set (step 438), and operation returns to point B.

A multi-channel transmitter for remote control functions has been disclosed. Transmitters embodying the invention provide several advantages over conventional devices. These advantages include (a) allowing a single small hand-held transmitter to control many different functions or receiver devices in a convenient manner; (b) positive acknowledgement to the user of the entry of channel selection data through simple audio messages in the form of beeps or even a voice-synthesized message, so that even when the device is operated in darkness the user can readily and quickly select a desired channel; (c) protection against inadvertent transmission of a channel code, since accidental actuation of the channel select switch or the transmit switch will not cause transmission unless the channel switch is first actuated and the transmit switch is thereafter actuated within a short period of time, e.g., 3 seconds; (d) automatic connection and disconnection of the battery power to the transmitter circuits, following actuation of the channel select switch, thereby conserving battery power; (e) the provision of a unique transmit code byte through the combination of a stored transmitter base code and the selected channel count; (f) audio and/or visual indication to the user of the transmitted channel; and (g) quick and convenient channel selection through either a single channel select switch or the combination of a single channel and a decade channel select switch. Additionally, through the use of a microprocessor and a nonvolatile digital memory such as an $E^2$PROM, the manufacturer of the transmitter obtains several advantages, including:

(a) The ability to achieve very high code security through the use of a large number of code bits at no increase in the number of output pins in the encoding circuitry of the transmitter. Many prior art devices have require a number of output pins sufficient to define the code in a binary format (e.g., to have eight different codes, three pins were required).

(b) The security code for each transmitter unit can be programmed electronically, rather than by setting switches, punching lines or scratching traces.

(c) The manufacturer can produce various code security levels in the same type of device, through an increase or decrease in the number of bits comprising the security code without an increase in production cost.

It is understood that the above-described embodiments are merely illustrative of the possible specific embodiments which may represent principles of the present invention. Other arrangements may readily be devised in accordance with these principles by those skilled in the art without departing from the scope of the invention.

What is claimed is:

1. A hand-held multi-channel remote control transmitter for transmitting a selected one of a plurality of possible channel codes preassigned for particular functions in a security system, comprising:

a transmitter housing:

a transmitter circuit for transmitting encoded radio frequency (RF) signals;

at least one user-actuated channel select switch mounted for convenient access by the user without opening said housing and having on and off states;

a user-actuated transmit switch mounted for convenient access by the user without opening said housing and having on and off states; and a controller responsive to the states of said channel select and said transmit switches, said controller comprising:

means responsive to the number of times said channel select switch is actuated for providing a channel select count value;

means responsive to actuation of said transmit switch only when power is applied to the controller for providing a predetermined channel code in dependence on said channel select count value, where in actuation of said transmit switch is not operative to supply power to said controller, and wherein a different predetermined channel code corresponds to each channel count value, and for actuating said transmitter circuit to transmit a signal encoded with said selected channel code, whereby said transmitter is capable of transmitting a selected one of a plurality of possible channel codes in dependence on the number of times said channel select switch is actuated.

2. The transmitter of claim 1 further comprising a means for providing a channel select signal to the transmitter user indicative of the particular channel count value.

3. The transmitter of claim 2 wherein said channel select signaling means comprises means for generating an audible signal indicative of the channel count value.

4. The transmitter of claim 3 wherein said channel select signaling means comprises a piezoelectric audio transducer.

5. The transmitter claim 2 wherein said channel select signaling means comprises a means for visible display of said channel count value.

6. The transmitter of claim 5 wherein said means for visible display comprises a liquid crystal display.

7. The transmitter of claim 1 wherein said transmitter circuit comprises a circuit for generating an RF carrier and means for frequency modulating said carrier in response to said selected channel code.

8. The transmitter of claim 1 wherein said transmitter circuit comprises a circuit for generating an RF carrier and means for amplitude modulating said carrier in response to said selected channel code.

9. The transmitter of claim 1 further comprising a battery for providing electrical power to the transmitter, and means for automatically powering up the transmitter circuit elements and said controller only in response to user actuation of said channel select switch, and means for automatically disconnecting the power from said circuit elements and said controller a predetermined time after the last user actuation of said channel select or said transmit switch.

10. The transmitter of claim 1 further comprising a nonvolatile semiconductor memory for storing a digital base transmitter code comprising M bits, the N least significant bits of said base code being zero, and wherein said means for providing a predetermined channel code in dependence on said channel count value comprises means for assigning said N bits of said base code a value in dependence on the selected channel count value.

11. The transmitter of claim 1 wherein said controller comprises a microprocessor device and a nonvolatile semiconductor memory device for storing therein a digital base transmitter code for that particular transmitter device, the microprocessor comprising means for reading said base code from said memory device when the transmitter circuitry is powered up, said selected channel code being selected in dependence on said base code and said channel select count.

12. The transmitter of claim 1 further comprising a battery for providing electrical power to the transmitter, means for determining when the battery voltage drops below a predetermined level, and means for providing a signal to the transmitter user indicative of the low battery voltage condition.

13. The transmitter of claim 12 wherein said means for providing a signal to the transmitter user comprises means for generating an audible signal.

14. The transmitter of claim 1 wherein said means responsive to actuation of said channel select switch for providing a channel count comprises means for incrementing the channel count value each time said channel select switch is actuated.

15. The transmitter of claim 14 further wherein said means for providing a channel count value comprises means for decrementing the channel count value when said channel select switch has been continuously "on" for at least a predetermined time duration.

16. The transmitter of claim 14 further comprising means for generating an audio signal to the transmitter user each time the channel count value is incremented.

17. The transmitter of claim 1 further comprising means responsive to actuation of said transmit switch for providing a transmit channel signal to the user indicative of the transmitted channel code.

18. The transmitter of claim 17 wherein said means for providing a transmit channel signal comprises means for generating an audible signal indicative of the channel count.

19. The transmitter of claim 1 wherein said channel select switch comprises a single channel select switch and a decade channel select switch, and wherein said means responsive to actuation of said channel select switches for providing a channel select count value comprises:

means responsive to actuation and release of said single channel select switch for changing said channel count value by one count; and means responsive to actuation and release of said decade channel select switch for changing said channel count value by ten counts.

20. A hand-held multi-channel remote control transmitter for a vehicle security system, comprising:

a transmitter housing;

a transmitter circuit for transmitting encoded radio frequency (RF) signals;

at least one user-actuated channel select switch mounted for convenient access by the user without opening said housing and having on and off states;

a user-actuated transmit switch mounted for convenient access by the user without opening said housing and having on and off states;

a controller responsive to the states of said channel select and said transmit switches, said controller comprising:

means monitoring the number of times said channel select switch is actuated for providing a channel select signal;

means responsive to actuation of said transmit switch for selecting a predetermined unique channel code in dependence on the number of times said channel select switch has been actuated and for actuating said transmitter circuit for transmitting a signal encoded with said selected code, whereby said transmitter is capable of transmitting a selected one of many possible unique channel codes.

21. The transmitter of claim 20 further comprising a means for providing a channel select signal to the transmitter user indicative of the particular channel selected by the user actuation of said channel select switch.

22. The transmitter of claim 20 wherein said channel select signaling means comprises means for generating an audible signal indicative of the channel selected.

23. The transmitter of claim 22 wherein said channel select signaling means comprises a piezoelectric audio transducer.

24. The transmitter of claim 20 wherein said transmitter circuit comprises a circuit for generating an RF carrier and means for frequency modulating said carrier in response to said selected channel code.

25. The transmitter of claim 20 wherein said transmitter circuit comprises a circuit for generating an RF carrier and means for amplitude modulating said carrier in response to said selected channel code.

26. The transmitter of claim 20 further comprising a battery for providing electrical power to the transmitter, and means for automatically powering up the transmitter circuit elements and said controller in response to user actuation of said channel select switch, and means for automatically disconnecting the power from said circuit elements and said controller a predetermined time after the last user actuation of said channel select or said transmit switch.

27. The transmitter of claim 20 further comprising a nonvolatile semiconductor memory for storing a digital base transmitter code comprising a plurality of M bits, the N least significant bits of said base code being zero, and wherein said controller further comprises means for assigning said N bits of said base code a value in dependence on the selected channel.

28. The transmitter of claim 20 wherein said controller comprises a microprocessor device and a nonvolatile semiconductor memory device for storing therein a base transmitter code for that particular transmitter device, the microprocessor comprising means for reading said base code from said semiconductor memory when the transmitter circuitry is powered up, said selected channel code being selected in dependence on said base code and said channel select signal.

29. The transmitter of claim 20 further comprising a battery for providing electrical power to the transmitter, means for determining when the battery voltage drops below a predetermined level, and means for providing a signal to the transmitter user indicative of the low battery voltage condition.

30. The transmitter of claim 29 wherein said means for providing a signal to the transmitter user comprises means for generating an audible signal.

31. The transmitter of claim 20 further comprising means for generating an audio signal to the transmitter user each time said channel selected switch is actuated.

32. A hand-held multi-channel remote control transmitter for a security system for transmitting a selected one of a plurality of possible channel codes, comprising:

a transmitter housing;

a channel select switch and a transmit switch mounted for convenient access by the user without opening said housing, said switches having "on" and "off" states;

a transmitter circuit for transmitting encoded radio frequency (RF) signals;

a battery for providing electrical power to said transmitter;

means responsive only to actuation of said channel select switch to the "on" state for powering up the transmitter controller;

a controller responsive to the states of said channel select and transmit switches, said controller comprising:

means activated on powering up of said controller for maintaining electrical power to said controller for a predetermined time interval after release of said channel select switch;

means responsive to actuation of said channel select switch for providing a channel select count value, said means comprising means for incrementing or decrementing the count value each time said switch is actuated;

means responsive to actuation of said transmit switch only when power is applied to the controller for providing a predetermined channel code in dependence on said channel select count value, wherein a different predetermined channel code corresponds to each channel count, and for actuating said transmitter circuit to transmit a signal encoded with said selected channel code; and means for turning the power to said controller off a predetermined time after the last actuation of said transmit or channel select switch.

33. The transmitter of claim 32 further comprising means for determining when the battery voltage drops below a predetermined level, and means for providing an audible signal when the controller is powered up indicating the low battery voltage level condition.

34. The transmitter of claim 32 further comprising means for generating an audio signal to the transmitter user each time the channel count value is changed.

35. A hand-held multi-channel remote control transmitter for transmitting a selected one of a plurality of possible channel codes preassigned to particular functions for an electronic security system, comprising:

a transmitter housing;

a transmitter circuit for transmitting an encoded radio frequency (RF) signals;

a user-actuated single channel select switch mounted for convenient access by the user without opening said housing and having on and off states;

a user-actuated decade channel select switch mounted for convenient access by the user without opening said housing and having on and off states;

a transmit switch having on and off states; and a controller responsive to the states of said single channel select switch, said decade channel select switch and said transmit switch, said controller comprising:

means responsive to the number of times said single channel select switch and said decade channel select switch are actuated for providing a channel select count value, comprising means responsive to each actuation of said single channel select switch for changing the channel count value by one count, and means responsive to each actuation of said decade channel select switch for changing the channel count value by ten counts or integral multiples of ten; and means responsive to actuation of said transmit switch only when power is applied to the controller for providing a predetermined channel code in dependence on said channel select count and for actuating said transmitter circuit to transmit a signal encoded with said selected channel code, whereby said transmitter is capable of transmitting a selected one of a plurality of possible channel codes.

36. The transmitter of claim 35 further comprising a means for providing a channel select signal to the transmitter user indicative of the particular channel count value.

37. The transmitter of claim 36 wherein said channel select signaling means comprises means for generating an audible signal indicative of the channel count value.

38. The transmitter of claim 37 wherein said channel select signaling means comprises a piezoelectric audio transducer.

39. The transmitter of claim 36 wherein said channel select signaling means comprises a means for visible display of said channel count value.

40. The transmitter of claim 39 wherein said means for visible display comprises a liquid crystal display.

41. The transmitter of claim 35 wherein said transmitter circuit comprises a circuit for generating an RF carrier and means for frequency modulating said carrier in response to said selected channel code.

42. The transmitter of claim 35 wherein said transmitter circuit comprises a circuit for generating an RF carrier and means for amplitude modulating said carrier in response to said selected channel code.

43. The transmitter of claim 35 further comprising a battery for providing electrical power to the transmitter, and means for automatically powering up the transmitter circuit elements and said controller in response to user actuation of said single channel select switch or said decade channel select switch, and means for automatically disconnecting the power from said circuit elements and said controller a predetermined time after the last user actuation of said channel select switches or said transmit switch.

44. The transmitter of claim 35 further comprising a nonvolatile semiconductor memory for storing a base transmitter code comprising M bits, the N least significant bits of said base code being zero, and wherein said means for providing a predetermined channel code in dependence on said channel count value comprises means for assigning said N bits of said base code a value in dependence on the selected channel count value.

45. The transmitter of claim 35 wherein said controller comprises a microprocessor device and a nonvolatile semiconductor memory device for storing therein a base transmitter code for that particular transmitter device, the microprocessor comprising means for reading said base code when the transmitter circuitry is powered up, said selected channel code being selected in dependence on said base code and said channel select count value.

46. The transmitter of claim 35 further comprising a battery for providing electrical power to the transmitter, means for determining when the battery voltage drops below a predetermined level, and means for providing a signal to the transmitter user indicative of the low battery voltage condition.

47. The transmitter of claim 46 wherein said means for providing a signal to the transmitter user comprises means for generating an audible signal.

48. The transmitter of claim 35 further comprising means responsive to actuation of said transmit switch for providing a transmit channel signal to the user indicative of the transmitted channel code.

49. The transmitter of claim 48 wherein said means for providing a transmit channel signal comprises means for generating an audible signal indicative of the channel count.

50. The transmitter of claim 35 wherein said means for providing a channel count comprises means for decrementing the channel count value when said single channel select switch has been continuously "on" for at least a predetermined time duration.

51. The transmitter of claim 35 wherein said means for providing a channel select count value comprises means for decrementing the channel count value by ne or more decades when said decade channel select switch has been continuously "on" for at least a predetermined time duration.

52. The transmitter of claim 35 further comprising means for generating an audio signal to the transmitter user each time the channel count value is changed.

* * * * *